(12) United States Patent
Burda et al.

(10) Patent No.: US 7,305,276 B2
(45) Date of Patent: Dec. 4, 2007

(54) METHOD, SYSTEM, AND COMPUTER PROGRAM PRODUCT FOR CONTROLLING THE FLOW OF MATERIAL IN A MANUFACTURING FACILITY USING AN EXTENDED ZONE OF CONTROL

(75) Inventors: Richard G. Burda, Pleasant Valley, NY (US); Alfred T. Degbotse, Colchester, VT (US); Brian T. Denton, Rochester, MN (US); Kenneth J. Fordyce, Hurley, NY (US); Robert J. Milne, Jericho, VT (US)

(73) Assignee: International Business Machines Corporation, Armonk, NY (US)

( * ) Notice: Subject to any disclaimer, the term of this patent is extended or adjusted under 35 U.S.C. 154(b) by 107 days.

(21) Appl. No.: 11/163,793

(22) Filed: Oct. 31, 2005

(65) Prior Publication Data

US 2007/0100486 A1     May 3, 2007

(51) Int. Cl.
*G06F 19/00* (2006.01)
(52) U.S. Cl. .................................... 700/100
(58) Field of Classification Search ............... 700/96, 700/97, 100, 103, 121
See application file for complete search history.

(56) References Cited

U.S. PATENT DOCUMENTS

| | | | |
|---|---|---|---|
| 5,325,304 A | 6/1994 | Aoki | 700/100 |
| 5,826,236 A | 10/1998 | Narimatsu et al. | 705/8 |
| 6,263,253 B1 * | 7/2001 | Yang et al. | 700/99 |
| 6,360,132 B2 | 3/2002 | Lin et al. | 700/97 |
| 6,434,443 B1 | 8/2002 | Lin | 700/100 |
| 6,687,563 B1 | 2/2004 | Wang et al. | 700/121 |
| 6,845,280 B1 | 1/2005 | Rives et al. | 700/121 |
| 6,907,305 B2 * | 6/2005 | Mata et al. | 700/99 |
| 2003/0171972 A1 * | 9/2003 | Heskin | 705/9 |

FOREIGN PATENT DOCUMENTS

| | | |
|---|---|---|
| JP | 56019635 A | 2/1981 |
| JP | 5108116 A | 4/1993 |

OTHER PUBLICATIONS

Bolander et al. . Scheduling Techniques:A Comparison of Logic, 2000, Prodcution and inventory management journal, pp. 1-5.*
Lozinski et al. Bottleneck Starvation Indicators for Shop Floor Control, 1988, IEEE, pp. 147-153.*

* cited by examiner

*Primary Examiner*—Leo Picard
*Assistant Examiner*—Chad Rapp
(74) *Attorney, Agent, or Firm*—Richard M. Kotulak; Hoffman, Warnick & D'Alessandro LLC

(57) ABSTRACT

The present invention provides a method, system, and computer program product for controlling the flow of material in a manufacturing facility using an extended zone of control. A method in accordance with an embodiment of the present invention comprises establishing an extended zone of control including a high impact tool set and at least one other tool set, analyzing projected job arrivals at the high impact tool set, and adjusting a flow of material between the high impact tool set and the at least one other tool set based on the analysis of projected job arrivals at the high impact tool set.

7 Claims, 5 Drawing Sheets

METHOD, SYSTEM, AND COMPUTER PROGRAM PRODUCT FOR CONTROLLING THE FLOW OF MATERIAL IN A MANUFACTURING FACILITY USING AN EXTENDED ZONE OF CONTROL

BACKGROUND OF THE INVENTION

1. Field of the Invention

The present invention relates to the field of manufacturing facility control such as used in a semiconductor manufacturing facility; more specifically, the present invention relates to a method, system, and computer program product for controlling the flow of material in a manufacturing facility using an extended zone of control.

2. Related Art

One of the critical questions that must be answered in a manufacturing facility (e.g., a semiconductor manufacturing facility) is: "what lot to run next on a tool when the tool becomes free?" This is referred to as a "What Next" dispatch decision and is currently determined by what is referred to generically as a What-Next-Module (WNM). This decision is one of a hierarchical set of matching (assets with demand) decisions in which an asset (e.g., a manufacturing tool) can execute one of several manufacturing processes, and a demand is a lot (e.g., a wafer lot) requiring one of the manufacturing processes the tool can execute. The WNM must ensure that various system constraints are not violated (e.g., capacity constraints, lot-to-tool compatibility, batch size limits, etc.). Other constraints can be established by business guidelines (e.g., lot type to tool dedication strategies, tool specific inhibits, phase in tools, etc.). Within these constraints, the WNM attempts to account for a series of dispatching metrics including: priorities, due dates, lot dependent setups, maximizing batch size, work in process (WIP) balancing, and synchronization across the manufacturing facility.

Dispatching ideally identifies the next lot to run on a tool which optimizes the position of the total supply chain based on constraints and metrics such as those described above. Current dispatching-based systems typically rely on real-time list based scheduling in which lots immediately available for dispatch are sorted based on identified criteria, and lots are released based on this priority ordering. These are commonly referred to as "opportunistic dispatching systems." There is substantial prior art addressing this list-based dispatching. One known method is based on the concept of critical ratio, which is defined as follows:

critical ratio=(lot due date−current date)/(standard days processing).

Current dispatching methodologies focus on lots currently waiting to be, or very soon to be, processed at a tool (i.e., in a local zone of control). To this extent, there is little awareness of upstream activities, downstream requirements, and future dispatching decisions (i.e., in an extended zone of control). Such information, if properly utilized, could be used to enhance the performance of the tools within a manufacturing facility and, as a result, overall manufacturing performance.

SUMMARY OF THE INVENTION

The present invention generally provides a method, system, and computer program product for controlling the flow of material in a manufacturing facility using an extended zone of control.

A first aspect of the present invention is directed to a method for controlling a flow of material in a manufacturing facility, comprising establishing an extended zone of control including a high impact tool set and at least one other tool set, analyzing projected job arrivals at the high impact tool set, and adjusting a flow of material between the high impact tool set and the at least one other tool set based on the analysis of projected job arrivals at the high impact tool set.

A second aspect of the present invention is directed to a system for controlling a flow of material in a manufacturing facility, comprising a system for establishing an extended zone of control including a high impact tool set and at least one other tool set, and a game planner for analyzing projected job arrivals at the high impact tool set and for adjusting a flow of material between the high impact tool set and the at least one other tool set based on the analysis of projected job arrivals at the high impact tool set.

A third aspect of the present invention is directed to program product stored on a computer readable medium for controlling a flow of material in a manufacturing facility, the computer readable medium comprising program code for performing the steps of establishing an extended zone of control including a high impact tool set and at least one other tool set, analyzing projected job arrivals at the high impact tool set, and adjusting a flow of material between the high impact tool set and the at least one other tool set based on the analysis of projected job arrivals at the high impact tool set.

The foregoing and other features of the invention will be apparent from the following more particular description of embodiments of the invention.

DETAILED DESCRIPTION OF THE INVENTION

The decision on what job to run next on a given tool is typically governed by one of three types of methods: (a) local opportunistic scavenging that quickly looks for the best lot to assign to a tool (i.e., machine) once it becomes free; (b) building a fixed sequence schedule over some time horizon at a specified tool set (comprising one or more tools); and (c) flow control driving to a global importance indicator such as amount behind schedule, work in progress (WIP) distribution, or cycle time dampening. A Local Control Agent (LCA) is the decision technology component that assigns lots to its tool set based on whichever method it uses and whatever factors it considers. Examples of factors considered by an LCA may include: tool characteristics (e.g., number of tools up/down, expected time to be repaired, current setup state, time to setup to process a different type of job), WIP characteristics (e.g., global job importance, availability, quantity, processing time), and business policy parameters. Each LCA operates on its own tool set based on its local and global domain knowledge. It is presumed that each LCA may be executed in production mode (to assign real lots to real tools) and in simulation what-if mode.

Figure 1:
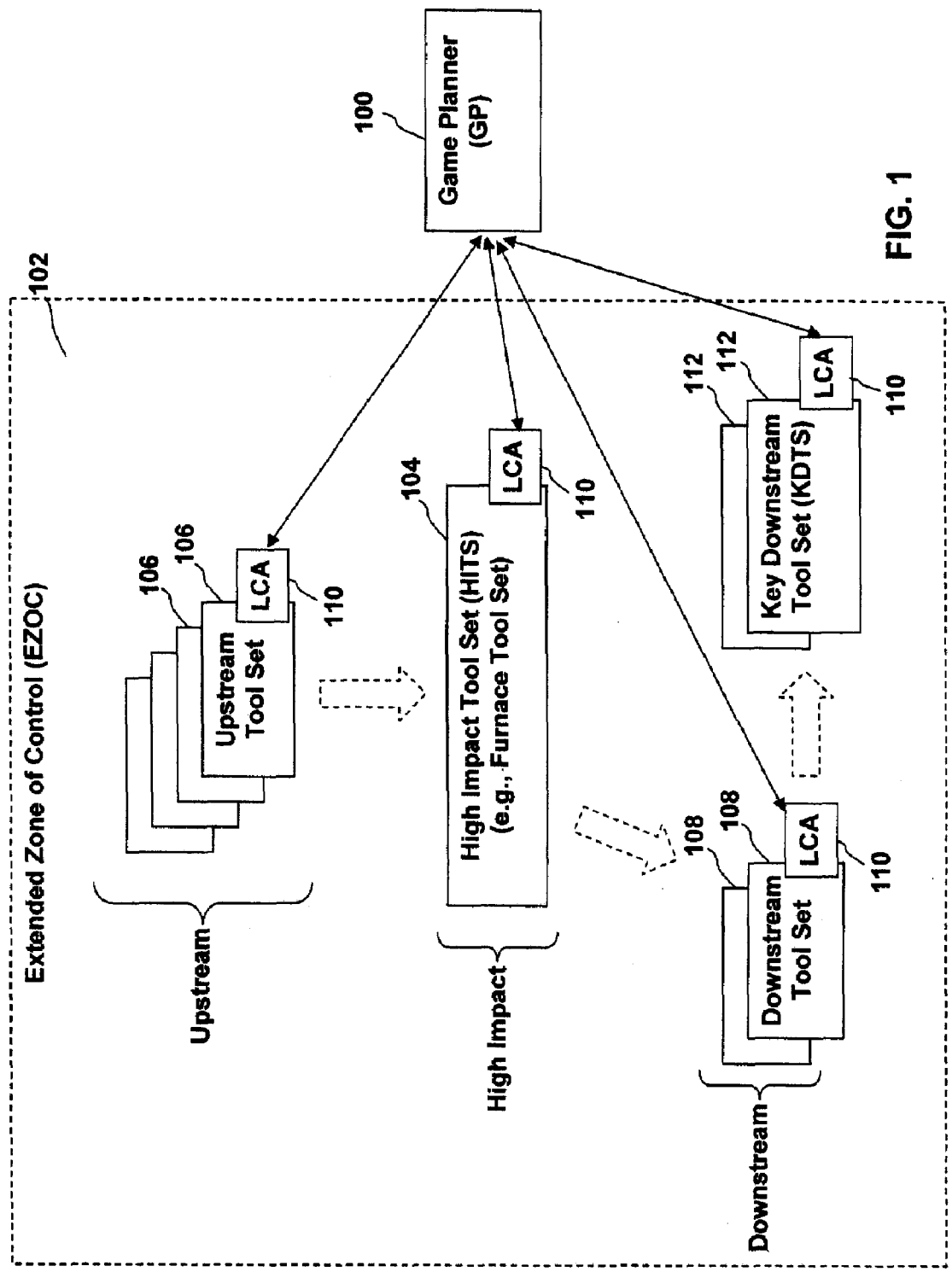
FIG. 1 depicts an illustrative system including a game planner (GP) and an extended zone of control (EZOC) in accordance with an embodiment of the present invention.

The present invention provides a Game Planner (GP) for improving the coordination of a set of LCAs throughout an Extended Zone Of Control (EZOC). An illustrative GP 100 and EZOC 102 in accordance with an embodiment of the present invention is depicted in FIG. 1. The EZOC 102 includes a High Impact Tool Set (HITS) 104 (e.g., a furnace tool set in the semiconductor industry), upstream tool sets 106, downstream tool sets 108, and Key Downstream Tool Sets (KDTS) 112. The HITS 104, each upstream tool set 106, each downstream tool set 108, and each Key Downstream Tool Set (KDTS) 112, are scheduled or dispatched according to a respective LCA 110. The upstream tool sets 106 are chosen as those tool sets that process jobs which are expected to arrive at the HITS 104 within a specified time duration (e.g., within a specified cumulative cycle time or total raw process time between the upstream tool sets 106 and the HITS 104).

The HITS 104 is a focus area for scheduling purposes within the EZOC 102 and typically comprises a set of equipment that may restrict the overall throughput of a manufacturing facility if it is not scheduled properly. The HITS 104 may be a tool set whose productivity is highly dependent upon the mix of jobs available for lot assignment. In the semiconductor industry, for example, a furnace tool set is one example of a HITS 104 (lithography and ion implantation tool sets are other examples). Furnace tool sets are sensitive to the mix of jobs available since only jobs with shared furnace processing characteristics may be processed together in a single batch. It is desirable to run full batches in the furnace operation which requires the availability of multiple jobs sharing the same furnace operating parameters. At the same time it is undesirable to have a furnace tool set be idle while it waits for enough lots with the same operating parameters to arrive to make a full batch. Consequently, within the EZOC 102, the GP 100 coordinates and synchronizes the scheduling of the upstream tool sets 106 so that the HITS 104 (e.g., a furnace tool set) will tend to be able to run full batches and further so that the output of the HITS 104 will tend to comprise jobs that may be processed soon at the downstream tool sets 108, particularly any Key Downstream Tool Sets (KDTS) 112 of interest. The objective with respect to the KDTS 112 is to prevent starvation (due to idle tools within the KDTS 112) and to avoid large amounts of excess Work In Process (WIP) awaiting processing by the KDTS 112. However, optimizing the flow of material to the KDTS 112 may be of secondary importance to the GP's objective of optimizing the HITS 104. The GP 100 optimizes the HITS 104 and KDTS 112 by working collaboratively and iteratively with the respective LCAs 110. The GP 100 accomplishes this by influencing—not dictating—the myriad of decisions (e.g., What's Next decisions) made by the LCAs 110. As depicted in FIG. 1, the LCAs 110 provide information such as planned output, lot status/arrival, and tool status to the GP 100. The GP 100 provides information such as lot arrival forecasts and LCA control parameters to the LCAs 110.

Figure 2:
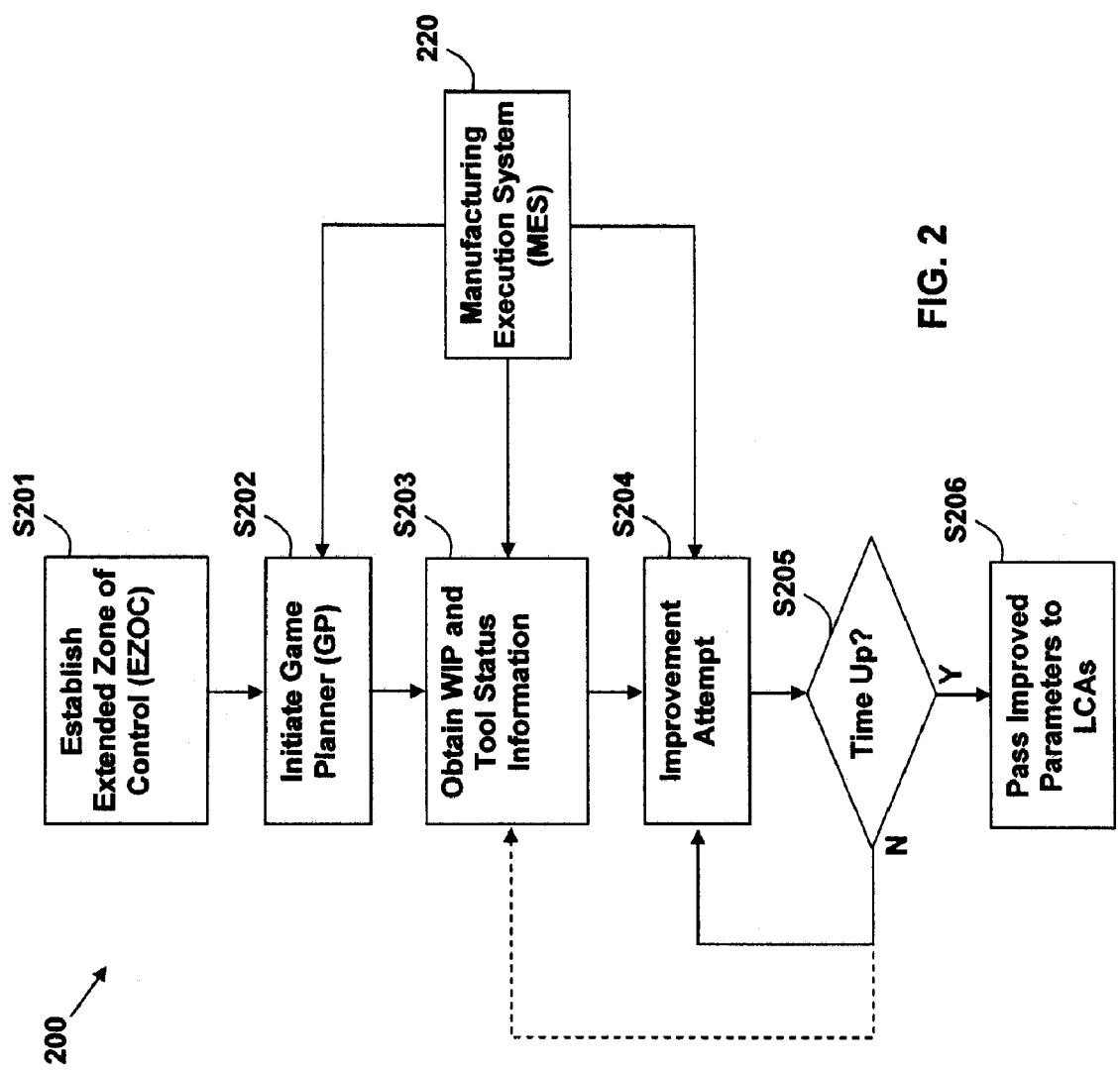
FIG. 2 depicts an illustrative flow diagram of a process for controlling the flow of material in a manufacturing facility using an EZOC in accordance with an embodiment of the present invention.

A flow diagram 200 of a process for controlling the flow of material in a manufacturing facility using an EZOC 102 in accordance with an embodiment of the present invention is illustrated in FIG. 2. The flow diagram 200 and other associated flow diagrams are described below with reference to the system components illustrated in FIG. 1.

Figure 3:
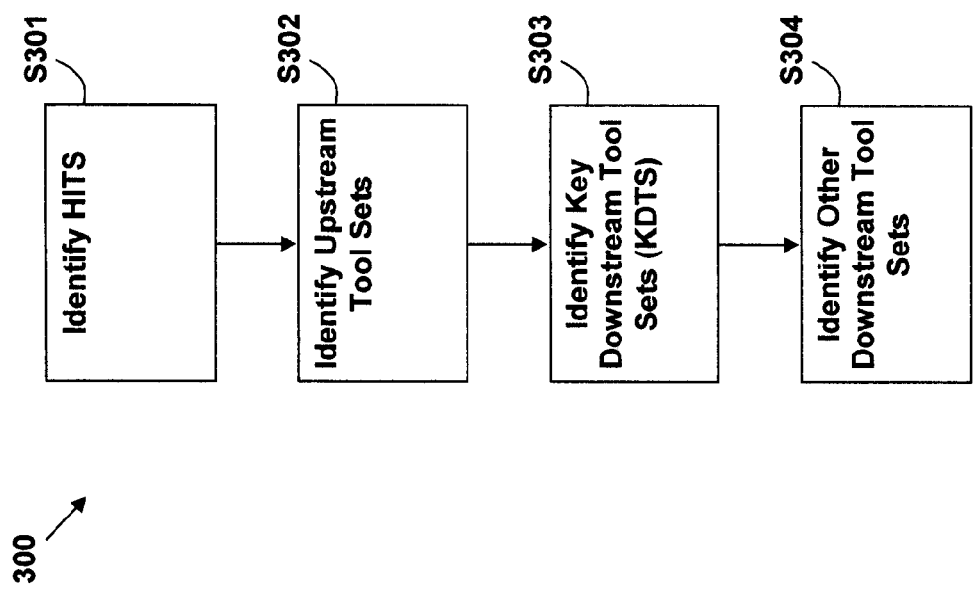
FIG. 3 depicts an illustrative flow diagram of a process for establishing an EZOC in accordance with an embodiment of the present invention.

In step S201, the infrastructure of the EZOC 102 is established. The establishment of the EZOC 102 is illustrated in greater detail in the flow diagram 300 depicted in FIG. 3. In particular, in step S301, the HITS 104 is identified. The HITS 104 can be identified, for example, based on human judgment; it is typically a set of equipment which may restrict the overall throughput of a manufacturing facility if it is not scheduled properly, and it may be a tool set whose productivity is highly dependent upon the mix of jobs available for lot assignment. An automated method for identifying the HITS 104 can also be used.

In step S302, one or more upstream tool sets 106 are identified. For example, the upstream tool sets 106 are typically identified as those tool sets that process jobs which are expected to arrive at the HITS 104 within a specified time duration (e.g., within a specified cumulative cycle time or total raw process time between the upstream tool set 106 and the HITS 104). In step S303, one or more KDTS 112 are identified. The KDTS 112 can be identified, for example, based on human judgment and are typically those downstream tool sets 108 for which it is important to avoid starvation and excess WIP build up. Again, an automated method for choosing the KDTS 112 can also be used. Finally, in step S304, the remaining tool sets that process jobs between the HITS 104 and the KDTS 112 are identified as downstream tool sets 108. Since an EZOC 102 typically does not need to be established very often (e.g., every day), steps S301 to S304, corresponding to step S201 of FIG. 2, need to be executed only periodically. The remaining steps of the flow diagram 200 (described below), however, are typically executed much more frequently.

In step S202 of the flow diagram 200, the GP 100 is initiated. This can occur in response to a variety of conditions and events, such as the completion of a job at a tool within the EZOC 102. Another example would be if a key tool becomes unusable and its repair time is expected to be long. Another example would be if a key tool is repaired unexpectedly early. WIP jobs put on hold, taken off hold, or scrapped could be also be used to initiate the GP 102. Tool and WIP changes are fed from a Manufacturing Execution System (MES) 220 to step S202. From a lot assignment perspective, an MES 220 is used to keep track of and report the status of the manufacturing floor (e.g., position of WIP in the line, which tools/machines are processing WIP, are available for processing, or are under repair). From a manufacturing production perspective, an MES 220 will also facilitate the execution of transactions such as those which move WIP between tool sets and from a tool set staging area onto a particular tool as well as recording the failure and repair of machines/tools. Manufacturing Execution Systems are sometimes referred to as, "shop floor control systems." The GP 100 may also be triggered when the elapsed time since its last run is greater than a pre-specified period of time. In any event, once the GP 100 is triggered, step S203 is executed.

In step S203, WIP data and tool status information is obtained. The WIP data and tool status information is provided by the MES 220 for all WIP jobs being processed at a tool set within the EZOC 102, or awaiting processing at a tool set within the EZOC 102, or being transported to a tool set within the EZOC 102. Each job is placed into one of three groups: Non-EZOC, EZOC-A, and EZOC-B. Non-EZOC jobs require processing by one of the tool sets of the EZOC 102 but do not require processing on the HITS 104 until after they have left the EZOC 102 (these jobs may not ever be processed on the HITS 104). EZOC-A jobs will be processed by the HITS 104 and a KDTS 112 prior to leaving the EZOC 102. EZOC-B jobs will leave the EZOC 102 after being processed by HITS 104 and are not processed by a KDTS 112 prior to leaving the EZOC 102, if ever. Each of these groups of jobs is considered in the simulations of the EZOC 102 discussed below. In addition to retrieving WIP data for the EZOC 102, step S203 also receives from the MES 220 the latest information on tool status (e.g., number of tools up and down in each tool set, expected remaining times to repair, tool processing times, etc.).

In step S204, one or more attempts to improve the performance of the EZOC 102 are made. If it is determined in step S205 that the "improvement attempt" iterations should be stopped, flow passes to step S206 and the GP 100 process ends. If not, flow passes back to step S204 where another improvement attempt is made. The stopping criteria for the GP 100 may be based on elapsed time, total number of iterations, total number of iterations since the last significant improvement, etc. In step S206, the improved parameters, if any, provided in step S204 are passed to the related "real world" LCAs 110 in the production environment.

In a preferred embodiment, step S204 executes quickly enough that there is a low likelihood of change to the MES 220 during the execution time. However, in another embodiment with a slower executing step S204, after the iterations of S204 have occurred for a specified period of time without fresh WIP/tool data, process flow may return from step S205 to step S203 (as indicated in phantom) at which time a new set of WIP and tool status information can be gathered from the MES 220.

Figure 4:
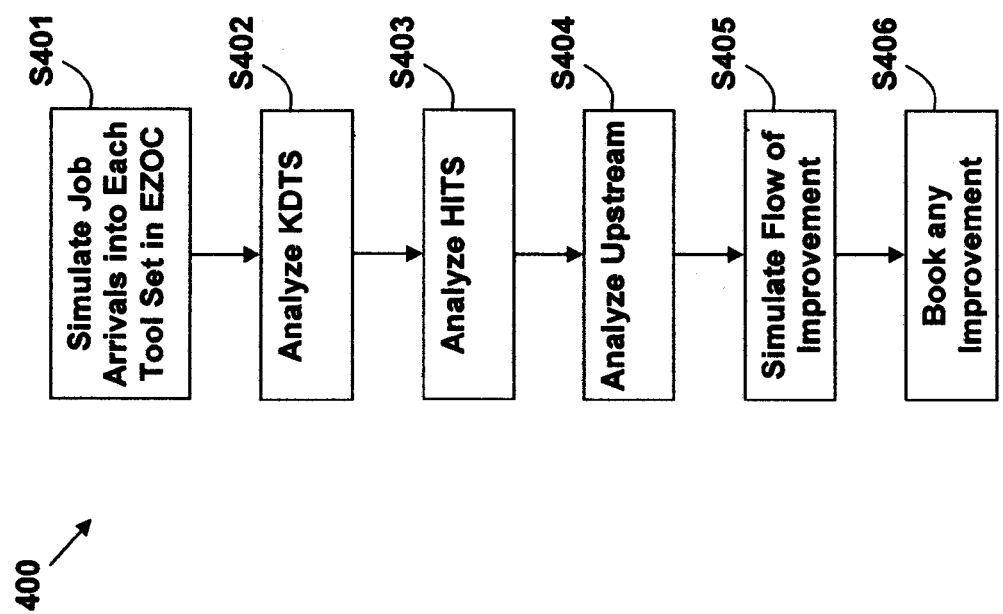
FIG. 4 depicts an illustrative flow diagram of the steps carried out by a GP in attempting to improve the performance of an EZOC in accordance with an embodiment of the present invention.

A flow diagram 400 of the steps carried out by the GP 100 in attempting to improve the performance of the EZOC 102 is illustrated in FIG. 4. In step S401, the arrivals of jobs into each tool set within the EZOC 102 is simulated. The GP 100 does this by simulating the most upstream tool set first, then the second most upstream tool set, and so forth throughout the EZOC 102 until eventually all KDTS 112 have been simulated. The job arrivals at any given tool set are those currently at the tool set plus those projected to arrive based on the jobs output by the simulation of any preceding tool sets. As such, the jobs output by one tool set are input to the next tool set downstream in the job's routing. These simulations may be done deterministically or stochastically and in any event invoke the what's next logic of the LCA 110 at each tool set. At the completion of step S401, the arriving WIP (including its characteristics) at each tool set is known based on the existing conditions and parameters and policies of the LCAs 110.

In step S402, the simulation results from the perspective of the KDTS 112 are examined. By analyzing the incidence of KDTS 112 starvation or excess WIP in the simulation results, an indication may be given to the LCA 110 of the HITS 104 as to whether the output of the HITS 104 would be more desirable if a different job mix or output rate were to be materialized. As such, the LCA 110 of the HITS 104 may adjust its (simulated) parameters so as to mitigate any impact on starvation or excess WIP at the KDTS 112.

In step S403, using the analysis results of step S402 as a partial objective, the HITS 104 output in terms of its performance as well against various other objectives is examined. Examples of the such objectives can include planned output against targets, wait time/delay for individual lots against targets, cycle time, production rate, etc. Step 403 attempts to identify unexplored opportunities such as HITS 104 partial batches (e.g., due to insufficient quantity of jobs requiring the same setup), and WIP jobs—especially high priority jobs—that are waiting too long to be processed. Step S403 selects some unexplored combination of: changes in arrival time of jobs into the HITS 104; changes in priority of jobs waiting at HITS 104; changes in the LCA 110 parameters of the HITS 104 (e.g., relative importance of large batches versus cycle time, etc.). Unexplored combinations are selected based on their potential to improve the solution. Step S403 tentatively makes the change and re-runs the LCA 110 of the HITS 104 to determine if the resulting impact appears to be better for the overall performance of the EZOC 102. If it is and the change involves a difference in the job arrivals at the HITS 104, then the GP 100 will pass control to step S404, which determines if the upstream tool sets 106 are able to deliver a revised job sequence and timing to the HITS 104. The upstream LCAs 110 are executed in simulation mode in step S404 with revised parameters (e.g., revised job priority) to determine if an improved set of job deliveries to the HITS 104 may be achieved. If it is, then in step S405, the entire material flow of the EZOC 102 is simulated (similar to step S401) with the revised policy and parameter settings. If this results in an overall improvement to the performance of the EZOC 102, then the resulting policies/parameters in the "simulated world view" are booked in step S406. In any event, following step S406, control returns the step S205 of FIG. 2 and the iterative attempts to improve the performance of the EZOC 102 continue until the stopping criteria has been reached.

By increasing the utilization and efficiency of the HITS 104 and KDTS 112, use of the present invention leads to improved performance of the manufacturing facility (or multiple facilities when the operations are disbursed across distinct geographies). Another advantage provided by the present invention is that it allows for each LCA 110 to be optimized based on the underlying characteristics of its local information. Each LCA 110 may have its own methodology and control structure.

Figure 5:
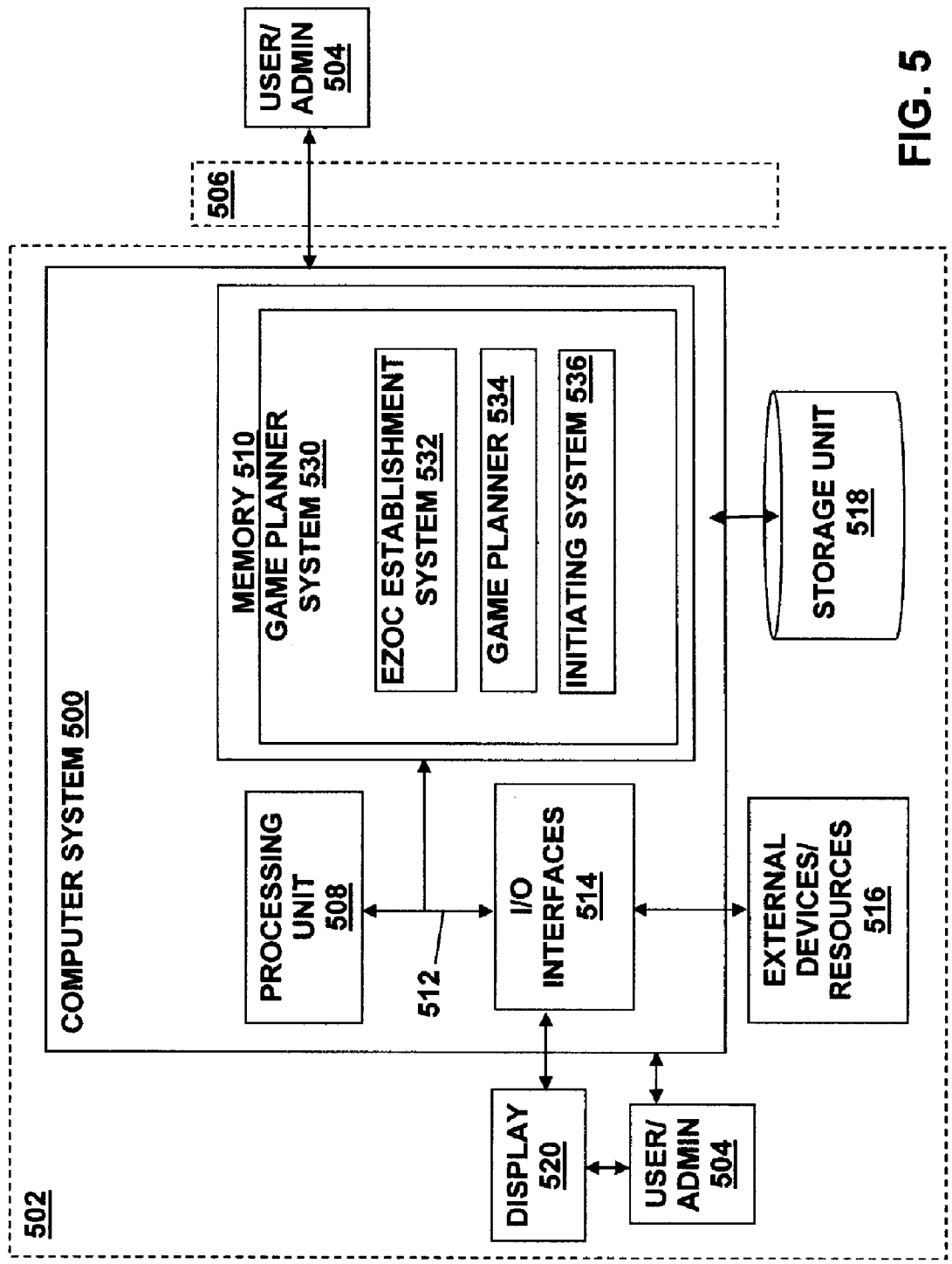
FIG. 5 depicts an illustrative computer system for implementing a method in accordance with an embodiment of the present invention The drawings are merely schematic representations, not intended to portray specific parameters of the invention. The drawings are intended to depict only typical embodiments of the invention, and therefore should not be considered as limiting the scope of the invention. In the drawings, like numbering represents like elements.

A computer system 500 for controlling the flow of material in a manufacturing facility using an extended zone of control in accordance with an embodiment of the present invention is depicted in FIG. 5. Computer system 500 is provided in a computer infrastructure 502. Computer system 500 is intended to represent any type of computer system capable of carrying out the teachings of the present invention. For example, computer system 500 can be a laptop computer, a desktop computer, a workstation, a handheld device, a server, a cluster of computers, etc. In addition, as will be further described below, computer system 500 can be deployed and/or operated by a service provider that offers a service for controlling the flow of material in a manufacturing facility using an extended zone of control in accordance with the present invention. It should be appreciated that a user 504 can access computer system 500 directly, or can operate a computer system that communicates with computer system 500 over a network 506 (e.g., the Internet, a wide area network (WAN), a local area network (LAN), a virtual private network (VPN), etc). In the case of the latter, communications between computer system 500 and a user-operated computer system can occur via any combination of various types of communications links. For example, the communication links can comprise addressable connections that can utilize any combination of wired and/or wireless transmission methods. Where communications occur via the Internet, connectivity can be provided by conventional TCP/IP sockets-based protocol, and an Internet service provider can be used to establish connectivity to the Internet.

Computer system 500 is shown including a processing unit 508, a memory 510, a bus 512, and input/output (I/O) interfaces 514. Further, computer system 500 is shown in communication with external devices/resources 516 and one or more storage systems 518. In general, processing unit 508 executes computer program code, such as game planner system 530, that is stored in memory 510 and/or storage system(s) 518. While executing computer program code, processing unit 508 can read and/or write data, to/from memory 510, storage system(s) 518, and/or I/O interfaces 514. Bus 512 provides a communication link between each of the components in computer system 500. External devices/resources 516 can comprise any devices (e.g., keyboard, pointing device, display (e.g., display 520), printer, etc.) that enable a user to interact with computer system 500 and/or any devices (e.g., network card, modem, etc.) that enable computer system 500 to communicate with one or more other computing devices.

Computer infrastructure 502 is only illustrative of various types of computer infrastructures that can be used to implement the present invention. For example, in one embodiment, computer infrastructure 502 can comprise two or more computing devices (e.g., a server cluster) that communicate over a network (e.g., network 506) to perform the various process steps of the invention. Moreover, computer system 500 is only representative of the many types of computer systems that can be used in the practice of the present invention, each of which can include numerous combinations of hardware/software. For example, processing unit 508 can comprise a single processing unit, or can be distributed across one or more processing units in one or more locations, e.g., on a client and server. Similarly, memory 510 and/or storage system(s) 518 can comprise any combination of various types of data storage and/or transmission media that reside at one or more physical locations. Further, I/O interfaces 514 can comprise any system for exchanging information with one or more external devices/resources 516. Still further, it is understood that one or more additional components (e.g., system software, communication systems, cache memory, etc.) not shown in FIG. 5 can be included in computer system 500. However, if computer system 500 comprises a handheld device or the like, it is understood that one or more external devices/resources 516 (e.g., a display) and/or one or more storage system(s) 518 can be contained within computer system 500, and not externally as shown.

Storage system(s) 518 can be any type of system (e.g., a database) capable of providing storage for information under the present invention. To this extent, storage system(s) 518 can include one or more storage devices, such as a magnetic disk drive or an optical disk drive. In another embodiment, storage system(s) 518 can include data distributed across, for example, a local area network (LAN), wide area network (WAN) or a storage area network (SAN) (not shown). Moreover, although not shown, computer systems operated by user 504 can contain computerized components similar to those described above with regard to computer system 500.

Shown in memory 510 (e.g., as a computer program product) is a game planner system 530 for controlling the flow of material in a manufacturing facility using an extended zone of control. The game planner system 530 includes an EZOC establishment system 532 for establishing an extended zone of control (e.g., EZOC 102, FIG. 1). An EZOC is established by the EZOC establishment system 532 by identifying a high impact tool set (HITS), upstream tool sets, key downstream tool sets (KDTS), and other downstream tool sets. The game planner system 530 also includes a game planner 534 and an initiating system 536 for initiating the game planner 534 in response to a set of predetermined conditions and/or events.

Once triggered, the game planner 534 obtains WIP data and tool status information from a manufacturing execution system (MES) for all WIP jobs being processed at a tool set within the EZOC, or awaiting processing at a tool set within the EZOC, or being transported to a tool set within the EZOC. The game planner 534 then iteratively attempts to improve the performance of the EZOC as described above with regard to the flow diagram 400 depicted in FIG. 4. The improved parameters for the EZOC are then passed by the game planner 534 to the related LCAs in the manufacturing facility.

The present invention can be offered as a business method on a subscription or fee basis. For example, one or more components of the present invention can be created, maintained, supported, and/or deployed by a service provider that offers the functions described herein for customers. That is, a service provider can be used to provide a service for controlling the flow of material in a manufacturing facility using an extended zone of control, as described above.

It should also be understood that the present invention can be realized in hardware, software, a propagated signal, or any combination thereof. Any kind of computer/server system(s)—or other apparatus adapted for carrying out the methods described herein—is suitable. A typical combination of hardware and software can include a general purpose computer system with a computer program that, when loaded and executed, carries out the respective methods described herein. Alternatively, a specific use computer, containing specialized hardware for carrying out one or more of the functional tasks of the invention, can be utilized. The present invention can also be embedded in a computer program product or a propagated signal, which comprises all the respective features enabling the implementation of the methods described herein, and which—when loaded in a computer system—is able to carry out these methods.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

The present invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device), or a propagation medium. Examples of a computer-readable medium include a semiconductor or solid state memory, magnetic tape, removable computer diskette, random access memory (RAM), read-only memory (ROM), rigid magnetic disk and optical disk. Current examples of optical disks include a compact disk—read only disk (CD-ROM), a compact disk—read/write disk (CD-R/W), and a digital versatile disk (DVD).

Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

What is claimed is:

1. A method for controlling a flow of material in a manufacturing facility, comprising:
    establishing an extended zone of control including a high impact tool set, at least one upstream tool set, and at least one key downstream tool set, wherein the upstream tool set comprises a tool set that processes a job that is expected to arrive at the high impact tool set within a specified period of time;
    analyzing projected job arrivals from each upstream tool set at the high impact tool set;
    adjusting a flow of material between the high impact tool set, each upstream tool set, and each key downstream tool set based on the analysis of projected job arrivals at the high impact tool set, the adjusting comprising adjusting a flow of material between the high impact tool set and each key downstream tool set to prevent starvation of each key downstream tool set and excess work in progress build up at each key downstream tool set.

2. The method of claim 1, wherein the high impact tool set and each uptream and key downstream tool set includes a local control agent.

3. The method of claim 1, wherein the high impact tool set comprises a tool set that restricts an overall throughput of the manufacturing facility if not scheduled properly.

4. A system for controlling a flow of material in a manufacturing facility, comprising:
    a system for establishing an extended zone of control including a high impact tool set, at least one upstream tool set, and at least one key downstream tool set, wherein the upstream tool set comprises a tool set that processes a job that is expected to arrive at the high impact tool set within a specified period of time;
    a game planner for analyzing projected job arrivals from each upstream tool set at the high impact tool set and for adjusting a flow of material between the high impact tool set, each upstream tool set, and each key downstream tool set based on the analysis of projected job arrivals at the high impact tool set, the adjusting comprising adjusting a flow of material between the high impact tool set and each key downstream tool set to prevent starvation of each key downstream tool set and excess work in progress build up at each key downstream tool set.

5. The system of claim 4, wherein the high impact tool set and each uptream and key downstream tool set includes a local control agent.

6. The system of claim 4, wherein the high impact tool set comprises a tool set that restricts an overall throughput of the manufacturing facility if not scheduled properly.

7. A program product stored on a computer readable medium for controlling a flow of material in a manufacturing facility, the computer readable medium comprising program code for performing the following steps:
    establishing an extended zone of control including a high impact tool set, at least one upstream tool set, and at least one key downstream tool set, wherein the upstream tool set comprises a tool set that processes a job that is expected to arrive at the high impact tool set within a specified period of time;
    analyzing projected job arrivals from each upstream tool set at the high impact tool set; and
    adjusting a flow of material between the high impact tool set, each upstream tool set, and each key downstream tool set based on the analysis of projected job arrivals at the high impact tool set, the adjusting comprising adjusting a flow of material between the high impact tool set and each key downstream tool set to prevent starvation of each key downstream tool set and excess work in progress build up at each key downstream tool set.

* * * * *